United States Patent

Shinchi

[19]

[11] Patent Number: 6,059,617
[45] Date of Patent: May 9, 2000

[54] CONNECTION STRUCTURE OF ELECTRIC WIRE AND TERMINAL

[75] Inventor: Akira Shinchi, Shizuoka-ken, Japan

[73] Assignee: Yazaki Corporation, Tokyo, Japan

[21] Appl. No.: 09/098,955

[22] Filed: Jun. 17, 1998

[30] Foreign Application Priority Data

Jun. 18, 1997 [JP] Japan .................................. 9-161449

[51] Int. Cl.[7] ................................................ H01R 4/02
[52] U.S. Cl. .................... 439/874; 174/84 R; 174/94 R; 29/872
[58] Field of Search .......................... 439/874; 174/84 R, 174/94 R; 29/872, 859

[56] References Cited

U.S. PATENT DOCUMENTS

| | | | |
|---|---|---|---|
| 5,057,650 | 10/1991 | Urushibata et al. | 174/94 R |
| 5,824,955 | 10/1998 | Saiso et al. | 439/874 |
| 5,857,259 | 1/1999 | Johnston | 29/872 |
| 5,869,784 | 2/1999 | Shinchi | 174/84 R |
| 5,906,044 | 5/1999 | Fujii et al. | 174/84 R |

FOREIGN PATENT DOCUMENTS

7-70345  3/1995  Japan .

*Primary Examiner*—Gary F. Paumen
*Assistant Examiner*—Katrina Davis
*Attorney, Agent, or Firm*—Finnegan, Henderson, Farabow, Garrett & Dunner, L.L.P.

[57] ABSTRACT

A protective member (28) having a melting point lower than a cover (12) is provided on a distal end of a protrusion (22) of the cover (12). A terminal (13) and a covered electric wire (19) are housed in a groove portion (18) of a connector housing (11), and the protrusion (22) of the cover (12) is inserted into the groove portion (18), and thereafter, an ultrasonic vibration is applied to the covered electric wire (19) and the terminal (13) from the cover (12). A covering portion (27) of the covered electric wire (19) is melted and removed by the ultrasonic vibration. The protective member (28) absorbs a heat generated in the cover (12) by applying the ultrasonic vibration, and is preferentially melted. Therefore, the protrusion (22) is not deformed due to the heat, so that a contact area of a core wire (26) and the terminal (13) can be secured.

10 Claims, 6 Drawing Sheets

CONNECTION STRUCTURE OF ELECTRIC WIRE AND TERMINAL

BACKGROUND OF THE INVENTION

1. Field of the Invention

The present invention relates to a connection structure of connecting an electric wire and a terminal by applying an ultrasonic vibration to the electric wire and the terminal.

2. Description of the Related Arts

Japanese Patent Application Laid-Open No. 7-70345 discloses a structure in which a covering portion of a covered electric wire is molten and removed by applying an ultrasonic vibration to these electric wire and terminal so as to conductively contact with a core wire of the covered electric wire and a terminal.

Figure 1A:
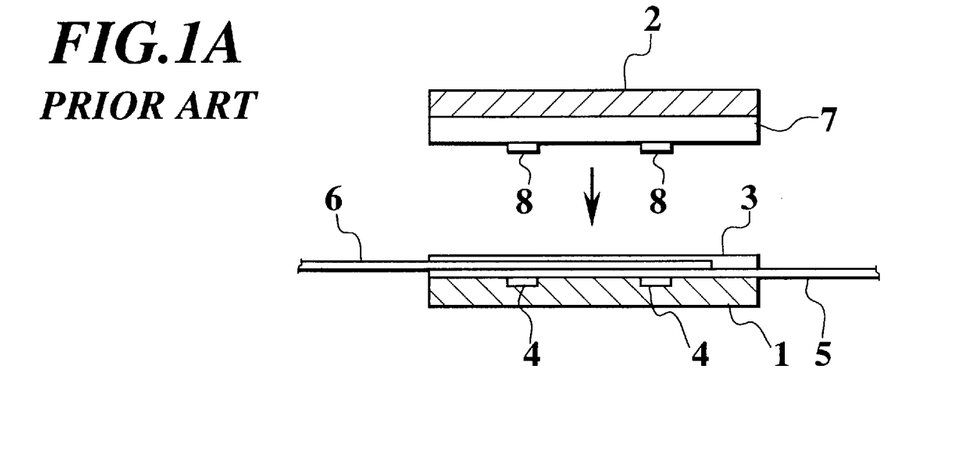
FIG. 1A is a cross-sectional view showing a conventional connection structure.
Figure 1B:
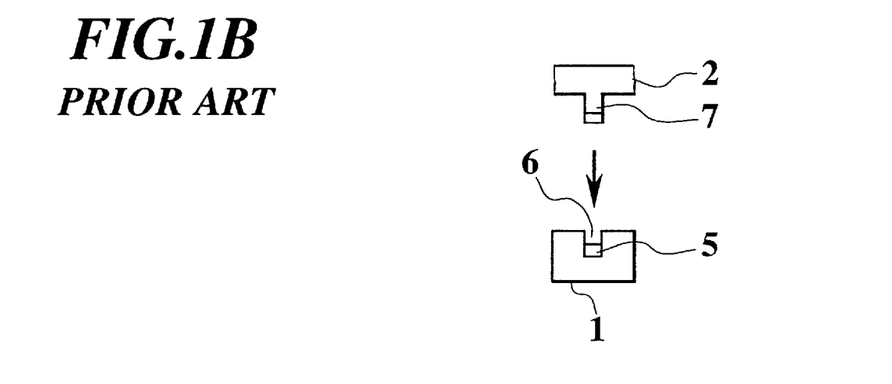
FIG. 1B is a front view of the conventional connection structure.

FIG. 1A and FIG. 1B each show a connector having a conventional structure in which a first member 1 and a second member 2 made of a resin face each other.

An upper surface of the first member 1 is formed with a groove portion 3 along a longitudinal direction thereof, and a small concave portion 4 is formed along a longitudinal direction of the groove portion 3 with a given interval. A terminal 5 is inserted into the groove portion 3 of the first member 1 along a longitudinal direction of the groove, and then, a covered electric wire 6 is placed on the terminal 5. The covered electric wire 6 is placed on the terminal 5 in a state that many core wires thereof are covered with a covering portion made of resin.

A lower surface of the second member 2 is formed with a protrusion 7 which is fitted into the groove portion 3 of the first member 1 and a small convex portion 8 which is fitted into the concave portion 4 of the groove 3, along the longitudinal direction thereof.

These members having the aforesaid structure is assembled in the following manner. More specifically, the terminal 5 and the covered electric wire 6 are inserted into the groove portion 3 of the first member 1, and then, in this state, the protrusion 7 of the second member 2 is fitted into the groove portion 3 of the first member 1 so that the terminal 5 and the covered electric wire 6 are pressed down by means of the second member 2 and the first member 1. At this time, the terminal 5 and the covered electric wire 6 are partially bent at a place where the concave portion 4 and the convex portion 8 are mutually fitted, so that these terminal and covered electric wire can be prevented from coming off.

And then, in a state that these terminal 5 and covered electric wire 6 are held between the first member 1 and the second member 2, ultrasonic vibration is applied to these members from an ultrasonic horn (not shown) while pressurizing them. A covering portion of the covered electric wire 6 is melted and removed by a heat generated by the ultrasonic vibration, and therefore, an internal core wire is exposed, and thus, the exposed core wire and the terminal 5 conductively contact with each other. With this conductive contact, the first member 1 and the second member 2 are integrally connected, so that a connector housing the terminal 5 and the electric wire can be provided.

Figure 2:
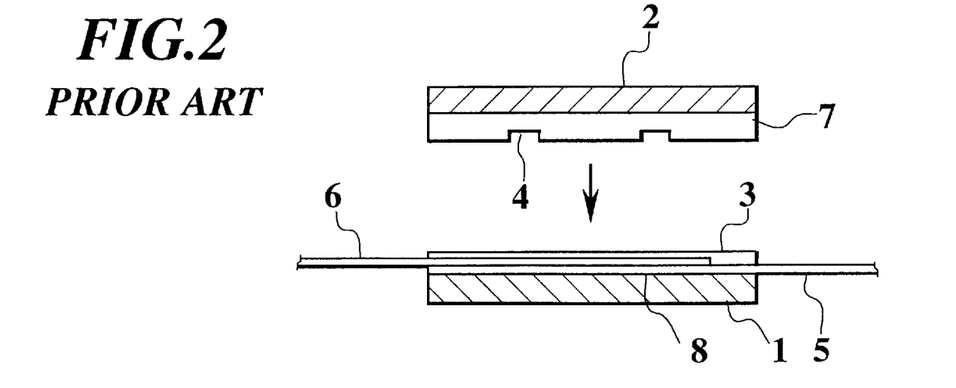
FIG. 2 is a cross-sectional view showing a conventionally another connection structure.

FIG. 2 shows an example converse to FIG. 1A and FIG. 1B. More specifically, a small convex portion 8 is formed in the groove portion 3 of the first member 1, and a small concave portion 4 fitted into the convex portion 8 is formed in the second member 2. Likewise, in this case, in the state that the terminal 5 and the covered electric wire 6 are held between the first member 1 and the second member 2, by applying the ultrasonic vibration thereto, it is possible to conductively contact the core wire with the terminal 5.

Figure 3:
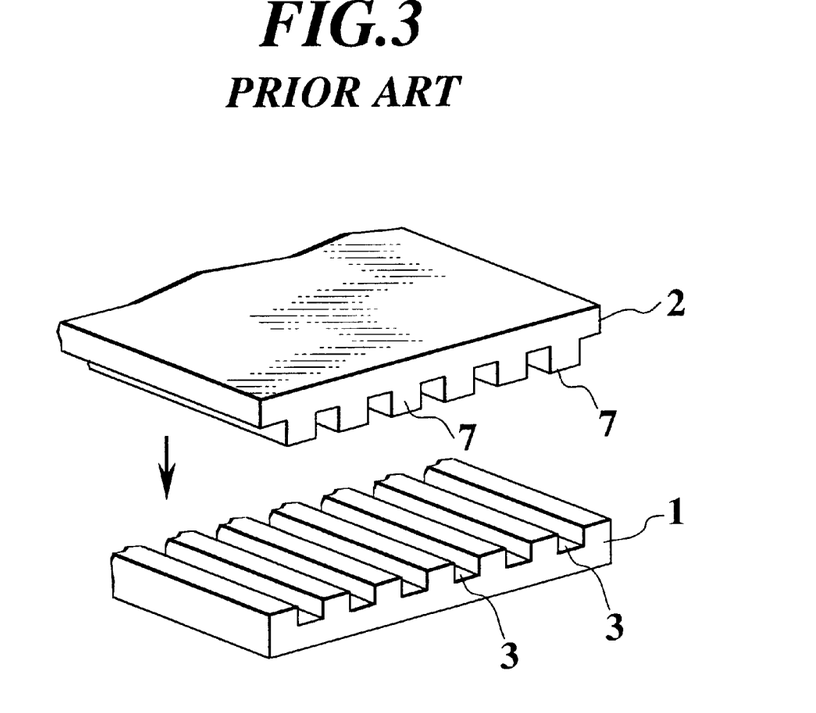
FIG. 3 is a perspective view showing a conventional multi-polar connector.

FIG. 3 shows a structure for preparing a multi-polar connector, and the first member 1 is formed with a plurality of groove portions 3; on the other hand, the second member 2 is formed with a plurality of protrusions 7 which face the groove portions 3. After the terminal is housed in the respective groove portions, the covered electric wire is placed on the terminal, and thereafter, in a state that these terminal and electric wire are held between the first member 1 and the second member 2, the ultrasonic vibration is applied to them while pressurizing the same to thereby prepare a connector.

Figure 4:
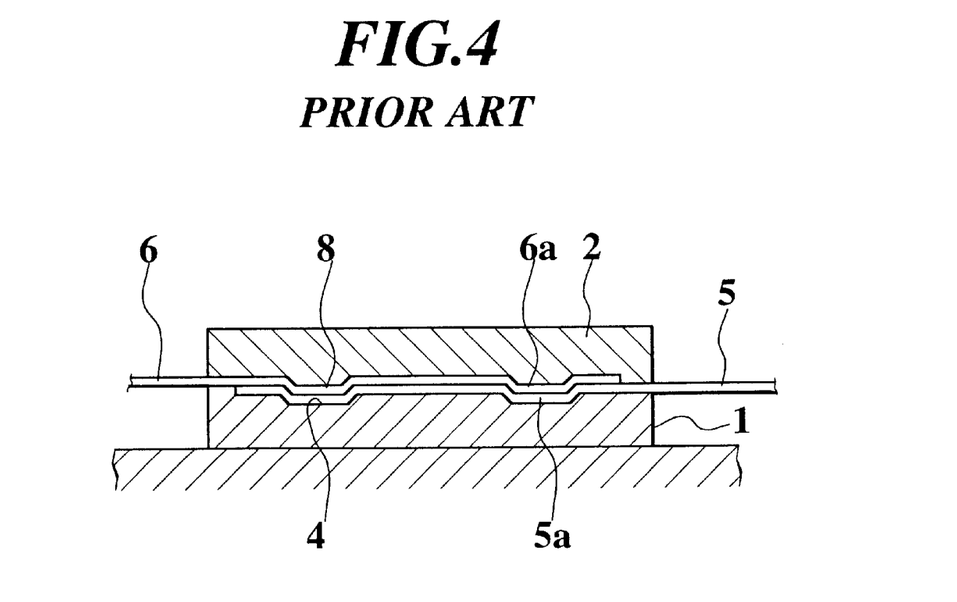
FIG. 4 is a cross-sectional view showing a conventional connection.

FIG. 4 shows a state that the terminal and the covered electric wire 6 are held between the first member 1 and the second member 2 having the structure as described above. And then, these terminal 5 and the covered electric wire 6 are pressed down by the protrusion of the second member 2 so as to be overlapped each other, and thus, bent portions 5a and 6a corresponding to the convex portion 8 and the concave portion 4 are formed to prevent these terminal and covered electric wire from coming off.

Figure 5:
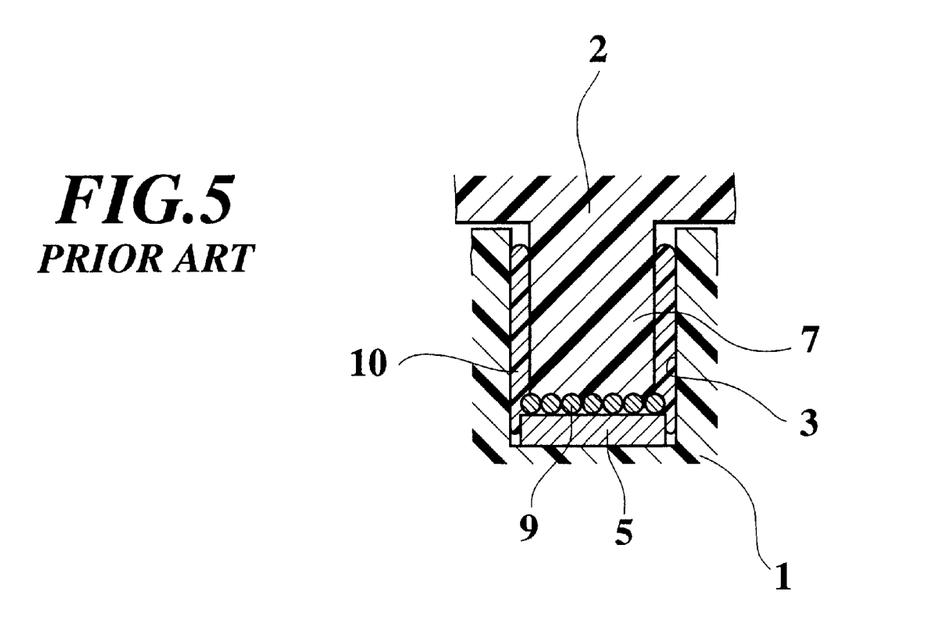
FIG. 5 is a cross-sectional view showing a conventionally ideal connective state.

However, according to the conventional structure, the core wire of the covered electric wire does not sufficiently contacts with the terminal; for this reason, the conventional structure has a problem that a contact resistance becomes large. FIG. 5 shows an ideal state that a core wire 9 of the covered electric wire and the terminal 5 contact with each other by ultrasonic vibration. More specifically, the covering portion of the covered electric wire is melted and removed, and then, the core wires 9 are exposed and contacts with the terminal 5 in a state of coming into line. Further, the exposed core wires 9 are held down by means of the protrusion 7 of the second member 2 so as to keep this contact state. At this time, the groove portion 3 is filled with the melted and removed covering portion, as shown by a reference numeral 10, and this serves to couple the first member 1 with the second member 2.

Figure 6:
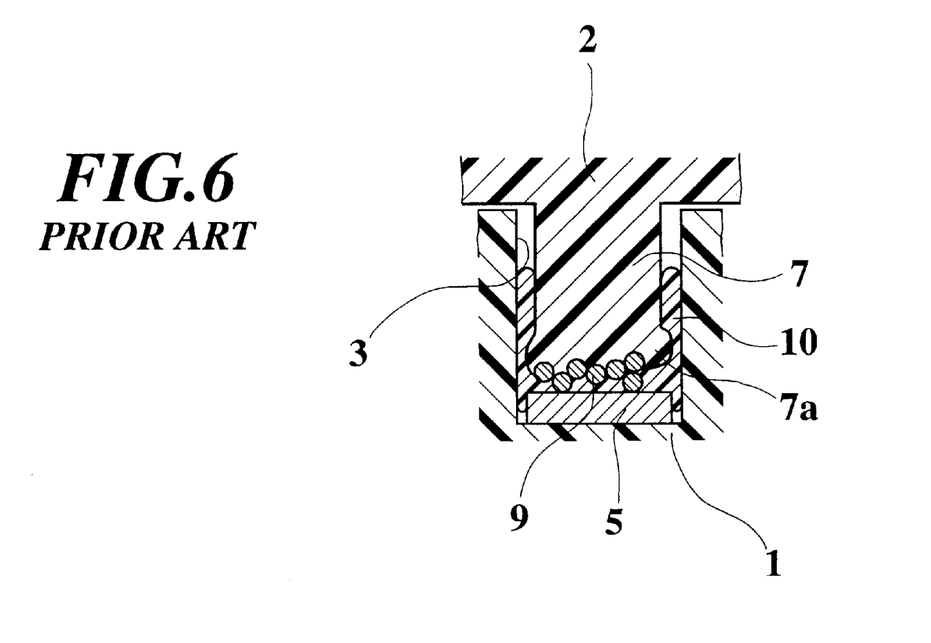
FIG. 6 is a cross-sectional view showing a conventionally non-preferable connective state.

In actual fact, the protrusion 7 is softened by a heat generated when the covering portion of the covered electric wire is melted; as a result, as shown in FIG. 6, a distal end portion 7a of the protrusion 7 is formed. By the deformation of the protrusion 7, it is impossible to hold down the core wires 9, nd the core wires 9 come loose in a row; for this reason, these ore wires 9 can not sufficiently contact with the terminal 5. As a result, a contact area is reduced, and a contact resistance becomes large.

In such a case, there is made a proposal of forming the second member 2 including the protrusion 7 of a resin having high heat-resistance. However, the high heat-resistant resin is expensive, and it is difficult to mold the resin; for this reason, precision is lowered. Further, the melted covering portion of the covered electric wire and the second member 2 are not effectively joined together; for this reason, there is a problem that these members are firmly assembled.

SUMMARY OF THE INVENTION

The present invention has been achieved with such points in mind.

It therefore is an object of the present invention to provide a connection structure of an electric wire and a terminal, which can preferably hold down a core wire without deforming a protrusion of a resin member, and can make little a contact resistance.

To achieve the object, according to a first aspect of the present invention, there is provided a connection structure of an electric wire and a terminal, comprising: a covered electric wire having a core wire covered with a covering portion made of a resin; a terminal; a first resin member having a groove portion housing the covered electric wire and the terminal; a second resin member having a protrusion; and a heat absorbing member provided on a contact portion of the resin member on a contacting side with the covered electric wire, wherein the protrusion is inserted into the groove portion so as to hold the terminal and the covered electric wire; the covering portion is melted and removed by applying an ultrasonic vibration or an ultrasonic wave oscillation so that the core wire and the terminal conductively contact with each other while being pressurized; and the heat absorbing member absorbs a heat generated in the resin member by applying the ultrasonic vibration or the ultrasonic wave oscillation.

In the present invention, the covering portion of the covered electric wire is melted and removed by the ultrasonic vibration, and thereby, the internal core wire is exposed, and conductively contacts with the terminal. Further, the heat absorbing member, which is provided on a contact portion of the first resin member contacting with the covered electric wire, absorbs a heat generated in the resin members by the ultrasonic vibration. Thus, the heat absorbing member is preferentially melted earlier than other portion of the contact portion of the resin members, and thereafter, is removed. For this reason, the heat generated by the ultrasonic vibration is not transmitted to other portion of the resin members, so that other portion of the resin members can not be softened and deformed. Therefore, the other portion of the resin members securely presses the core wire against the terminal, so that a contact area of the core wire and the terminal can be secured, and a contact resistance therebetween can be made small.

According to a second aspect of the present invention, as it depends from the first aspect, the heat absorbing member contains a protective member having a melting point lower than a melting point of the resin member.

The protective member having a melting point lower than that of the resin member is melted earlier than the resin member by a heat generated by the ultrasonic vibration. Thus, the heat generated by the ultrasonic vibration is consumed only to melt the protective member, and thereby, other portion of the resin member can be prevented from being softened and deformed due to the heat.

According to a third aspect of the present invention, as it depends from the second aspect, the protective member is provided on a distal end of the protrusion of the second resin member.

The protrusion of the second resin member holes down the covered electric wire and the terminal between the protrusion and the groove portion of one of the resin member. The protective member provided on the distal end of the protrusion preferentially absorbs a heat generated in the protrusion by the ultrasonic vibration, and then, is melted. Thus, the protrusion is not softened and deformed due to the heat, so that the protrusion can preferably hold down (press) the covered electric wire and the terminal. Further, since the protrusion is not softened and deformed, it is possible to securely press the core wire, which exposed by melting and removing the covering portion, against the terminal; therefore, the core wire and the terminal can preferably contact with each other.

According to a fourth aspect of the present invention, as it depends from the second aspect or the third aspect, the protective member is made of a resin or metal.

The protective member is melted by absorbing a heat generated by the ultrasonic vibration, and is removed together with the covering portion of the covered electric wire. Therefore, the protective member can be made of either resin or metal.

According to a fifth aspect of the present invention, as it depends from one aspect among the second aspect to the fourth aspect, the first resin member is a connector housing which is provided with a plurality of the groove portions; and the second resin member is a cover which is provided with a plurality of the protrusions corresponding to the groove portions, and is put on a section formed with the groove portions of the connector housing.

Even if the present invention is applied to a multi-polar typed connector, a contact area between the core wire and the terminal can be maintained.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

The contents of U.S. Pat. No. 5,584,122 are incorporated herein by reference.

There will be detailed below the preferred embodiments of the present invention with reference to the accompanying drawings. Like members are designated by like reference characters.

Figure 7:
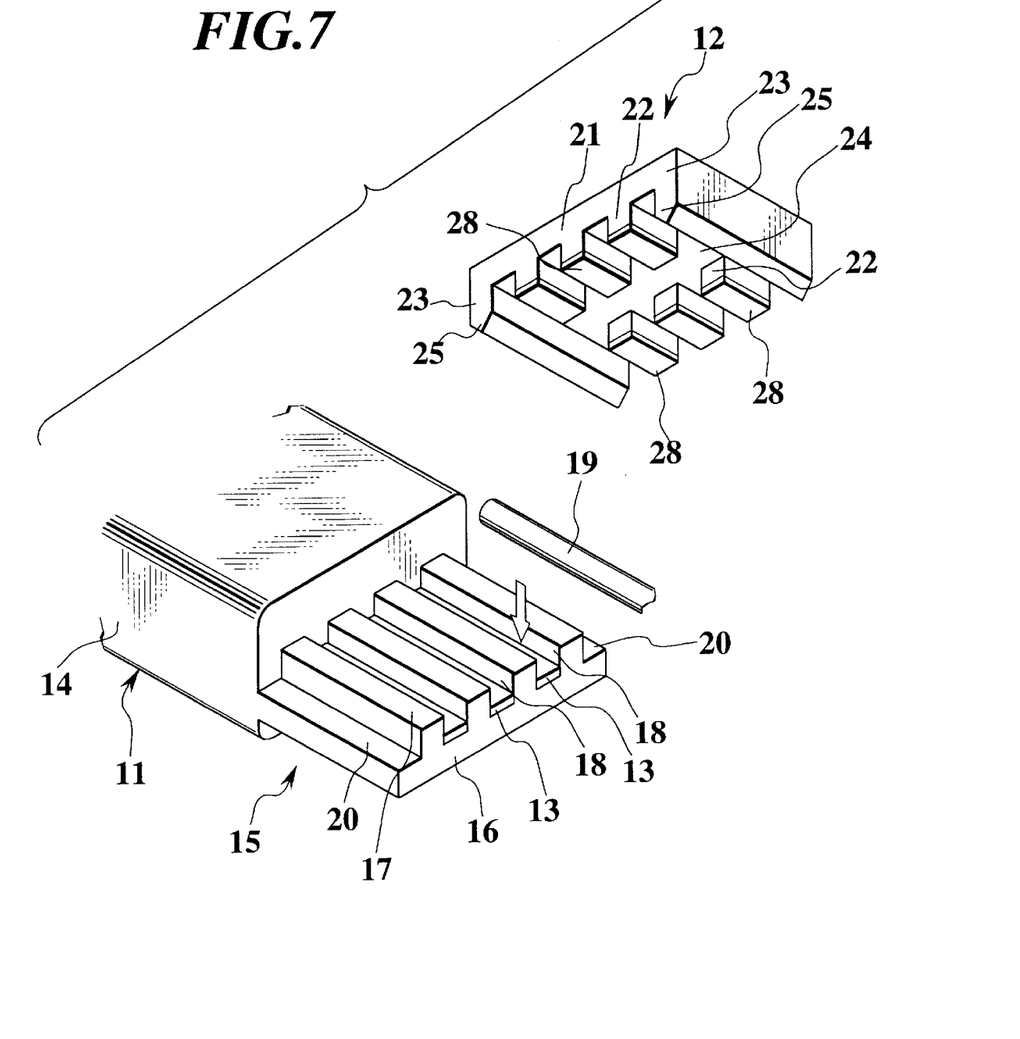
FIG. 7 is an exploded perspective view showing one embodiment of the present invention.
Figure 8A:
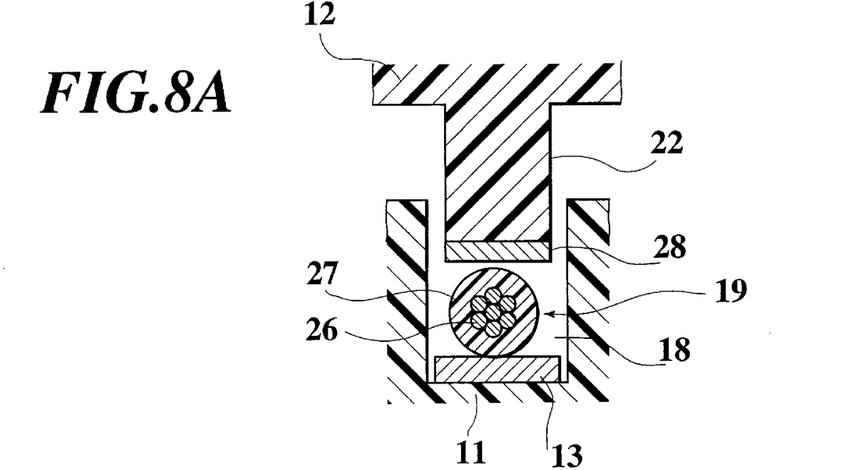
FIGS. 8A, 8B and 8C are cross-sectional views to explain an operation of applying an ultrasonic vibration in order.
Figure 8B:
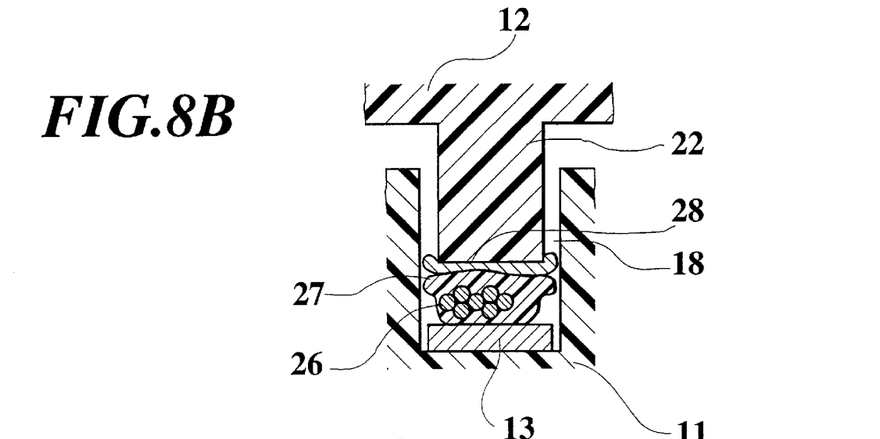
Figure 8C:
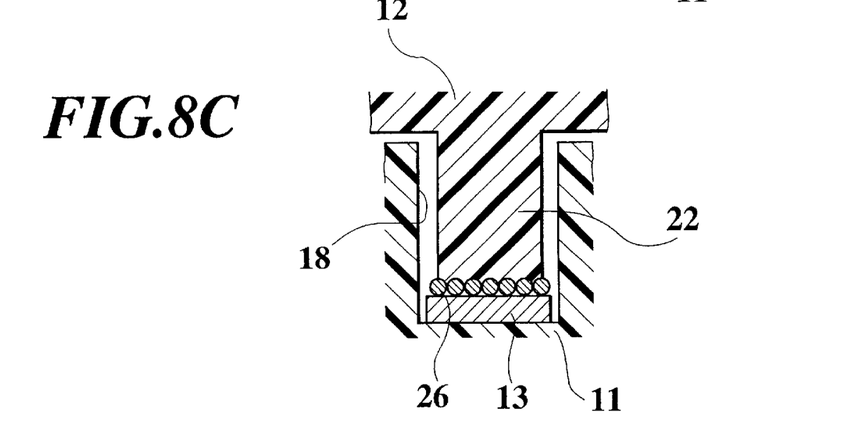
Figure 9:
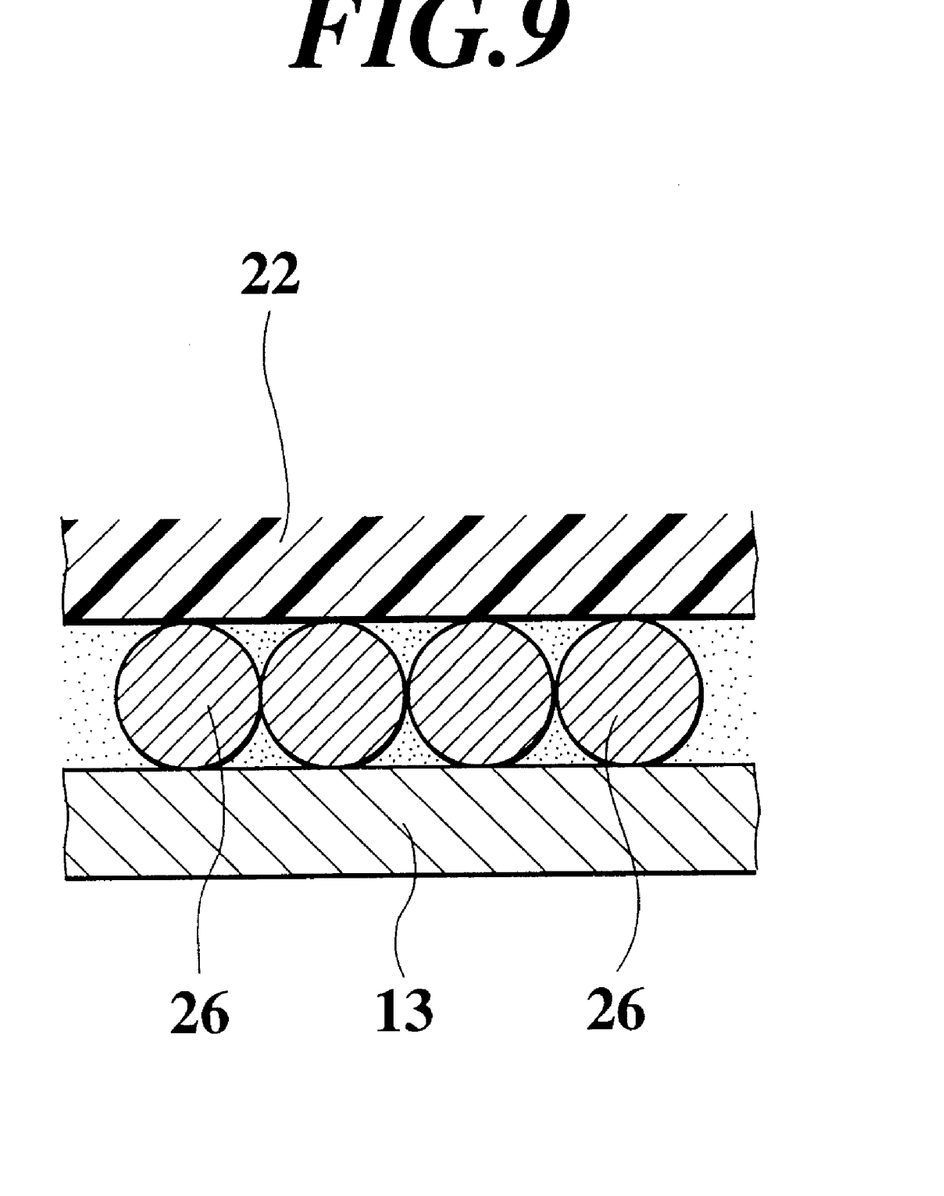
FIG. 9 is an enlarged cross-sectional view showing a state that a core wire and a terminal conductively contact with each other.

FIG. 7 is an exploded perspective view showing one embodiment of the present invention, FIGS. 8A, 8B and 8C are cross-sectional views to explain an operation of applying an ultrasonic vibration; and FIG. 9 is an enlarged cross-sectional view showing a state that a core wire and a terminal conductively contact with each other. As shown in FIG. 7, the present embodiment includes a first resin member 11, a second resin member 12, and a terminal 13 made of conductive metal.

This embodiment shows an example in which the present invention is applied to a connector. In this embodiment, the first resin member 11 functions as a connector housing, and the second resin member 12 functions as a cover.

The connector housing 11 includes a hood portion 14 which is coupled with an another (mating) connector (not shown) by being fitted thereto, and an electric wire leading portion 15 which is integrally formed in series on one side of the hood portion 14.

The wire leading portion 15 has a bottom wall 16 extending from the hood portion 14, and a plurality of partition walls 17 which individually project from the upper surface of the bottom wall 16 and extend in parallel. A portion defined between the partition walls 17 is formed as a groove portion 18. The groove portion 18 has a rectangular shape whose upper face is opened in its cross section, and the terminal 13 is housed in each groove portion 18 so as to make a connection with a covered electric wire 19. Further, an outside on the partition wall 17 in the bottom wall 16 is a welding portion 20 to which the cover 12 is welded.

The cover 12 includes a cover plate 21 covering the wire leading portion 15, a plurality of protrusions 22 which are formed so as to face the wire leading portion 15 in the cover plate 21, and a side wall 23 provided outside the protrusions 22.

The protrusion 22 has the same rectangular cross section as the groove portion 18 of the wire leading portion 15, and is formed at a position facing the groove portion 18. The protrusion 22 is formed so as to have a dimension slightly smaller than the groove portion 18, and is inserted into the corresponding groove portion 18 when putting the cover 12 on the wire leading portion 15. And then, the protrusion 22 thus inserted contacts with the covered electric wire 19 housed in the groove portion 18 so as to press the covered electric wire 19 against the terminal 13.

In this embodiment, each protrusion 22 has a notched portion 24 which is intermittently formed at an intermediate portion thereof. Thus, the protrusion 22 does not contact with the covered electric wire 19 housed in the groove portion 18 over the entire length thereof; in other words, the notched portion 24 does not contact with the covered electric wire 19. As described above, there is formed the notched portion 24 which does not contact with the covered electric wire 19, and by doing so, it is possible to release a covering portion 27, which is melted by applying an ultrasonic vibration, toward the notched portion 24.

The side wall 23 of the cover 12 faces the welding portion 20 of the wire leading portion 15, and is abutted against the welding portion 20 by putting the cover 12 on the wire leading portion 15. Further, the side wall 23 has a sharpened welding portion 25 at the distal end thereof. The sharpened welding portion 25 is welded together with the welding portion 20 of the wire leading portion 15 by ultrasonic vibration.

The terminal 13 is formed like a flat plate, and is guided in the groove portion 18 of the connector housing 11. Further, the terminal 13 penetrates through the hood portion 14 of the connector housing 11, and the penetrated end of the terminal 13 contacts with a terminal of a mating connector fitted into the hood portion 14 so as to be electrically connected therewith. Also, the terminal 13 conductively contacts a core wire 26 of the covered electric wire 19.

As shown in FIGS. 8A, 8B and 8C, the covered electric wire 19 is constructed in a manner that a plurality of core wires 26 are covered with a covering portion 27 made of an insulative resin such as vinyl chloride.

In addition to the aforesaid construction, in this embodiment, each protrusion 22 of the cover 12 is provided with a protective member 28 which functions as a heat absorbing member. The protective member 28 is made of a resin or metal having a melting point lower than the resin constituting the cover 12, and is provided so as to cover the distal end face of each protrusion 22.

In the case where the protective member 28 is made of a resin, an olefin-based resin such as polyethylene, polypropylene or the like and other resin having low melting point are used as the material. On the other hand, in the case where the protective member 28 is made of metal, a solder or the like is used as the material. Also, the protective member 28 is attached to the distal end of the protrusion 18 by two-color molding, bonding and fitting in the case of being made of resin and by bonding and fitting in the case of being made of metal.

The connector housing 11 and the cover 12 may be made of acrylic-based resin, ABS (acrylonitrile-butadiene-styrene copolymer)-based resin, PC (polycarbonate)-based resin, PVC (polyvinyl chloride)-based resin, olefin-based resin such as polyethylene, polypropylene or the like, PEI (polyetherimide)-based resin, PBT (polybutylene terephthalate)-based resin, ABS/vinyl-chloride alloy, acrylic/vinyl-chloride alloy, polyester-elastomer, or a block copolymer of PBT and polyether.

The following is a description on assembly in this embodiment.

As shown in FIG. 7, the terminal 13 is housed in each groove portion 18 of the connector housing 11 so that the distal end portion of the terminal 13 is penetrated through the hood portion 14. And then, the covered electric wire 19 is placed on each terminal 13, and thereafter, the cover 12 is put on the wire leading portion 15. At this time, as shown in FIG. 8A, each protrusion 22 is inserted into the corresponding groove portion 18 so as to hold the covered electric wire 19 and the terminal 13.

In this state, the ultrasonic horn (not shown) is abutted against the cover 12, and then, an ultrasonic vibration or an ultrasonic wave oscillation is applied thereto while pressurizing the members. As shown in FIG. 8B, the covering portion 27 of the covered electric wire 19 is heated, and thereafter, is melted and removed by the ultrasonic vibration.

Also, a heat is generated in the cover 12 by the ultrasonic vibration; however, the heat is absorbed by the protective member 28 having a low melding point, which is provided on the distal end of the protrusion 22, and the protective member 28 is preferentially melted earlier than other portions of the cover 12. Therefore, the protrusion 22 is not exothermic more than necessity, so that the protrusion 22 can not be softened and deformed.

Further, the covering portion 27 is melted and removed, and thereby, the core wire 26 is exposed from the covered electric wire 19, so that the exposed core 26 is pressed by the protrusion 22. At this time, the protrusion 22 is not deformed as described above, so that all core wires 26 can be uniformly and securely pressed.

Thus, as shown in FIG. 8C, the core wires 26 are arranged in a state of coming into line, and conductively contact with the terminal 13. FIG. 9 is an enlarged view showing a state that the core wire 26 conductively contact with the terminal 13. As described above, the protrusion 22 is not softened and deformed, so that the core wires 26 can be uniformly and securely contacted with each other. This serves to secure a contact area of the core wire 26 and the terminal 13, and therefore, a contact resistance can be made small. Also, the covering portion 27 and the protective member 28 melted by the ultrasonic vibration are removed from the groove portion 18.

The connector housing 11 and the cover 12 are joined together in a manner of abutting their welding portions 20 and 25 against each other, and by applying an ultrasonic vibration to these members while pressing the same.

While preferred embodiments of the present invention have been described using specific terms, such description is for illustrative purposes, and it is to be understood that changes and variations may be made without departing from the spirit or scope of the following claims.

What is claimed is:

1. A connection structure of an electric wire and a terminal, comprising:

a covered electric wire having a core wire covered with a covering portion made of a resin;

a terminal;

a first resin member having a groove portion housing the covered electric wore and the terminal;

a second resin member having a protrusion; and a heat absorbing member provided on a contact portion of the resin member on a contacting side with the covered electric wire, the heat absorbing member having a flat configuration, wherein the protrusion is inserted into the groove portion so as to hold the terminal and the covered electric wire;

the covering portion is melted and removed by applying an ultrasonic vibration so that the core wire and the terminal conductively contact each other while being pressurized; and the heat absorbing member absorbs a heat generated in the resin member by the application of the ultrasonic vibration.

2. The connection structure of an electric wire and a terminal according to claim 1, wherein the heat absorbing member contains a protective member having a melting point lower than a melting point of the resin member.

3. The connection structure of an electric wire and a terminal according to claim 2, wherein the protective member is made of a resin.

4. The connection structure of an electric wire and a terminal according to claim 2, wherein the protective member is made of a metal.

5. The connection structure of an electric wire and a terminal according to claim 2, wherein the first resin member is a connector housing which is provided with a plurality of the groove portions; and the second resin member is a cover which is provided with a plurality of the protrusions corresponding to the groove portions, and is put on a section formed with the groove portions of the connector housing.

6. The connection structure of an electric wire and a terminal according to claim 2, wherein the protective member is provided on a distal end of the protrusion of the second resin member.

7. The connection structure of an electric wire and a terminal according to claim 6, wherein the protective member is made of a resin.

8. The connection structure of an electric wire and a terminal according to claim 7, wherein the first resin member is a connector housing which is provided with a plurality of the groove portions; and the second resin member is a cover which is provided with a plurality of the protrusions corresponding to the groove portions, and is put on a section formed with the groove portions of the connector housing.

9. The connection structure of an electric wire and a terminal according to claim 6, wherein the protective member is made of a metal.

10. The connection structure of an electric wire and a terminal according to claim 9, wherein the first resin member is a connector housing which is provided with a plurality of the groove portions; and the second resin member is a cover which is provided with a plurality of the protrusions corresponding to the groove portions, and is put on a section formed with the groove portions of the connector housing.

* * * * *

UNITED STATES PATENT AND TRADEMARK OFFICE
CERTIFICATE OF CORRECTION

PATENT NO. : 6,059,617  
DATED : May 9, 2000  
INVENTOR(S) : Shinchi

Page 1 of 1

It is certified that error appears in the above-identified patent and that said Letters Patent is hereby corrected as shown below:

<u>Claim 1, Column 7,</u>
Line 17, "electric wore" should read -- electric wire --.

Signed and Sealed this

Twenty-eighth Day of August, 2001

*Attest:*

*Nicholas P. Godici*

NICHOLAS P. GODICI
*Attesting Officer*  *Acting Director of the United States Patent and Trademark Office*